United States Patent
Araki et al.

(10) Patent No.: US 11,763,958 B2
(45) Date of Patent: Sep. 19, 2023

(54) COMPOSITE MATERIAL STRUCTURE AND METHOD FOR MANUFACTURING COMPOSITE MATERIAL STRUCTURE

(71) Applicant: MITSUBISHI HEAVY INDUSTRIES, LTD., Tokyo (JP)

(72) Inventors: Toshiya Araki, Tokyo (JP); Tomoo Takizawa, Tokyo (JP); Hiroaki Yamaguchi, Tokyo (JP); Toshinobu Muraki, Tokyo (JP); Shunsuke Yoshino, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 585 days.

(21) Appl. No.: 16/981,565

(22) PCT Filed: Jan. 23, 2019

(86) PCT No.: PCT/JP2019/002114
§ 371 (c)(1),
(2) Date: Sep. 16, 2020

(87) PCT Pub. No.: WO2019/181184
PCT Pub. Date: Sep. 26, 2019

(65) Prior Publication Data
US 2021/0065925 A1 Mar. 4, 2021

(30) Foreign Application Priority Data
Mar. 20, 2018 (JP) .................................. 2018-052723

(51) Int. Cl.
*H01B 1/20* (2006.01)
*B32B 7/025* (2019.01)
(Continued)

(52) U.S. Cl.
CPC ............... *H01B 1/20* (2013.01); *B32B 7/025* (2019.01); *B32B 7/08* (2013.01); *B32B 7/12* (2013.01);
(Continued)

(58) Field of Classification Search
CPC .. B64C 1/00; B32B 27/08; B32B 7/08; B32B 7/12; B32B 7/025; H01B 1/20
(Continued)

(56) References Cited

U.S. PATENT DOCUMENTS 4,891,732 A 1/1990 Jones
8,854,787 B2 10/2014 Limmack et al.
(Continued)

FOREIGN PATENT DOCUMENTS

EP 3 225 555 10/2017
JP 2005-512319 4/2005
(Continued)

OTHER PUBLICATIONS

Extended European Search Report dated Sep. 9, 2021 in European Patent Application No. 19770413.3.
(Continued)

*Primary Examiner* — Tremesha S Willis
(74) *Attorney, Agent, or Firm* — Wenderoth, Lind & Ponack, L.L.P.

(57) ABSTRACT

Provided are a composite material structure obtained by joining composite materials with resin-impregnated reinforcing fibers, for which appropriate lightning proofing measures are taken, and a method for manufacturing the composite material structure. The composite material structure includes a first composite material, a second composite material, and a low-conductivity material. The first composite material includes a conductive first reinforcing fiber and a first resin impregnated into the first reinforcing fiber. The
(Continued)

second composite material is integrated with the first composite material, and has a conductive second reinforcing fiber and a second resin impregnated into the second reinforcing fiber. The low-conductivity material has an electrical resistance that is lower than that of the first resin and the second resin and a low conductivity that is greater than or equal to the first reinforcing fiber and the second reinforcing fiber, and electrically connects the first reinforcing fiber to the second reinforcing fiber.

6 Claims, 9 Drawing Sheets

(51) Int. Cl.
| | |
|---|---|
| B32B 7/08 | (2019.01) |
| B32B 7/12 | (2006.01) |
| B32B 27/08 | (2006.01) |
| B64C 1/00 | (2006.01) |
| B64D 45/02 | (2006.01) |
| F16B 11/00 | (2006.01) |
| H01B 1/24 | (2006.01) |
| H01B 5/00 | (2006.01) |

(52) U.S. Cl.
CPC .............. *B32B 27/08* (2013.01); *B64C 1/00* (2013.01); *B64D 45/02* (2013.01); *F16B 11/006* (2013.01); *H01B 1/24* (2013.01); *H01B 5/002* (2013.01); *B32B 2307/202* (2013.01); *B32B 2605/18* (2013.01); *B64C 2001/0072* (2013.01)

(58) Field of Classification Search
USPC .............................................................. 174/2
See application file for complete search history.

(56) References Cited

U.S. PATENT DOCUMENTS

| | | |
|---|---|---|
| 2011/0031350 A1 | 2/2011 | Sayilgan et al. |
| 2017/0284449 A1 | 10/2017 | Greegor et al. |
| 2017/0314606 A1 | 11/2017 | Le et al. |

FOREIGN PATENT DOCUMENTS

| | | |
|---|---|---|
| JP | 2007-301838 | 11/2007 |
| JP | 2012-6528 | 1/2012 |
| JP | 2017-185995 | 10/2017 |
| JP | 2018-21660 | 2/2018 |
| KR | 10-2017-0116470 | 10/2017 |
| WO | 03/049157 | 6/2003 |

OTHER PUBLICATIONS

International Search Report dated Apr. 23, 2019 in corresponding International (PCT) Application No. PCT/JP2019/002114.
Written Opinion of the International Searching Authority dated Apr. 23, 2019 in corresponding International (PCT) Application No. PCT/JP2019/002114, with English translation.

COMPOSITE MATERIAL STRUCTURE AND METHOD FOR MANUFACTURING COMPOSITE MATERIAL STRUCTURE

TECHNICAL FIELD

The present invention relates to a composite material structure and a method for manufacturing the composite material structure.

BACKGROUND ART

A composite material with resin-impregnated reinforcing fibers is used for a structure that constitutes an aircraft, an automobile, a vehicle, a marine vessel, or the like. The structure may be formed by joining and integrate composite materials. The composite materials are joined by, for example, adhesion using an adhesive material or the like, fastening using bolts, nuts, and the like.

For a structure in which metal materials are integrated with each other via an insulating material, lightning proofing measures are taken by providing electrical continuity between the integrated metal materials (see Patent Document 1).

CITATION LIST

Patent Document

Patent Document 1: U.S. Pat. No. 8,854,787

SUMMARY OF INVENTION

Technical Problem

The structure integrated by joining composite materials together, namely the composite material structure, in which even conductive reinforcing fibers may be covered with a non-conductive resin, disadvantageously, cannot thus be subject to the lightning proofing measures described in Patent Document 1.

In light of the foregoing, an object of the present invention is to provide a composite material structure obtained by joining composite materials with resin-impregnated reinforcing fibers, for which appropriate lightning proofing measures are taken, and a method for manufacturing the composite material structure.

Solution to Problem

In order to solve the problem and achieve the object described above, a composite material structure includes: a first composite material having a conductive first reinforcing fiber and a first resin impregnated into the first reinforcing fiber; a second composite material integrated with the first composite material, the second composite material having a conductive second reinforcing fiber and a second resin impregnated into the second reinforcing fiber; and a low-conductivity material having a lower electrical resistance than that of the first resin and the second resin and a low conductivity greater than or equal to that of the first reinforcing fiber and the second reinforcing fiber, the low-conductivity material electrically connecting the first reinforcing fiber to the second reinforcing fiber.

With this configuration, since the low-conductivity material having a lower electrical resistance than that of the first resin and the second resin and a low conductivity greater than or equal to that of the first reinforcing fiber and the second reinforcing fiber electrically connects the first reinforcing fiber impregnated with the first resin to the second reinforcing fiber impregnated with the second resin, lightning electricity can be passed to the first composite material and the second composite material in an appropriate range without any damage, thereby appropriately taking lightning proofing measures.

In this configuration, an insulating adhesive layer may be further provided which has electrically-insulating properties and integrates the first composite material with the second composite material by adhering them. With this configuration, even in the cases of reduced costs and reduced weight of the overall structure, lightning proofing measures may be appropriately taken in a similar manner.

In these configurations, preferably, one end of the low-conductivity material is embedded in the first resin to be electrically connected to the first reinforcing fiber, and the other end is embedded in the second resin to be electrically connected to the second reinforcing fiber. With this configuration, the low-conductivity material may electrically connect the first reinforcing fiber to the second reinforcing fiber at the embedded one and the other ends, thus appropriately setting a path for lightning electricity.

In the implementation in which one end of the low-conductivity material is embedded in the first resin to be electrically connected to the first reinforcing fiber, and the other end is embedded in the second resin to be electrically connected to the second reinforcing fiber, both the first resin and the second resin may be thermoplastic resins. With this configuration, the path for lightning electricity may be appropriately adjusted and changed by heating or cooling the first resin and the second resin.

Alternatively, as another implementation of the low-conductivity material, preferably, one end of the low-conductivity material is electrically connected to a first exposed portion of the first reinforcing fiber which is exposed on the surface of the first composite material, and the other end is electrically connected to a second exposed portion of the second reinforcing fiber which is exposed on the surface of the second composite material. With this configuration, at the first exposed portion and the second exposed portion, the low-conductivity material may electrically connect the first reinforcing fiber to the second reinforcing fiber, thus appropriately setting the path for lightning electricity.

As yet another implementation of the low-conductivity material, preferably, the low-conductivity material includes a low-conductivity sleeve disposed through the first composite material and the second composite material to cover a fastener configured to integrate the first composite material with the second composite material. With this configuration, even when it is required to integrate the first composite material with the second composite material using the fastener, appropriate lightning proofing measures may be taken in a similar manner.

In order to solve the problems and achieve the object described above, the method for manufacturing a composite material structure includes: a first composite material preparing step of preparing a first composite material having a conductive first reinforcing fiber and a first resin impregnated into the first reinforcing fiber; a second composite material preparing step of preparing a second composite material having a conductive second reinforcing fiber and a second resin impregnated into the second reinforcing fiber; and a low-conductivity material setting step of setting a low-conductivity material having a lower electrical resistance than that of the first resin and the second resin and a low conductivity greater than or equal to that of the first reinforcing fiber and the second reinforcing fiber, the low-conductivity material electrically connecting the first reinforcing fiber to the second reinforcing fiber.

With this configuration, in the low-conductivity material setting step, the low-conductivity material having a lower electrical resistance than that of the first resin and the second resin and a low conductivity greater than or equal to that of the first reinforcing fiber and the second reinforcing fiber electrically connects the first reinforcing fiber impregnated with the first resin to the second reinforcing fiber impregnated with the second resin, and therefore, lightning electricity may be passed to the first composite material and the second composite material in an appropriate range without any damage, thereby providing a composite material structure for which lightning proofing measures are appropriately taken.

DESCRIPTION OF EMBODIMENTS

Detailed descriptions will be given below of embodiments according to the present invention on the basis of the drawings. Note that, the invention is not limited to the embodiments. In addition, the constituent elements in the embodiments include those that can be easily replaced by a person skilled in the art or those that are substantially the same. The various constituent elements described hereafter may also be combined, as appropriate.

First Embodiment

Figure 1:
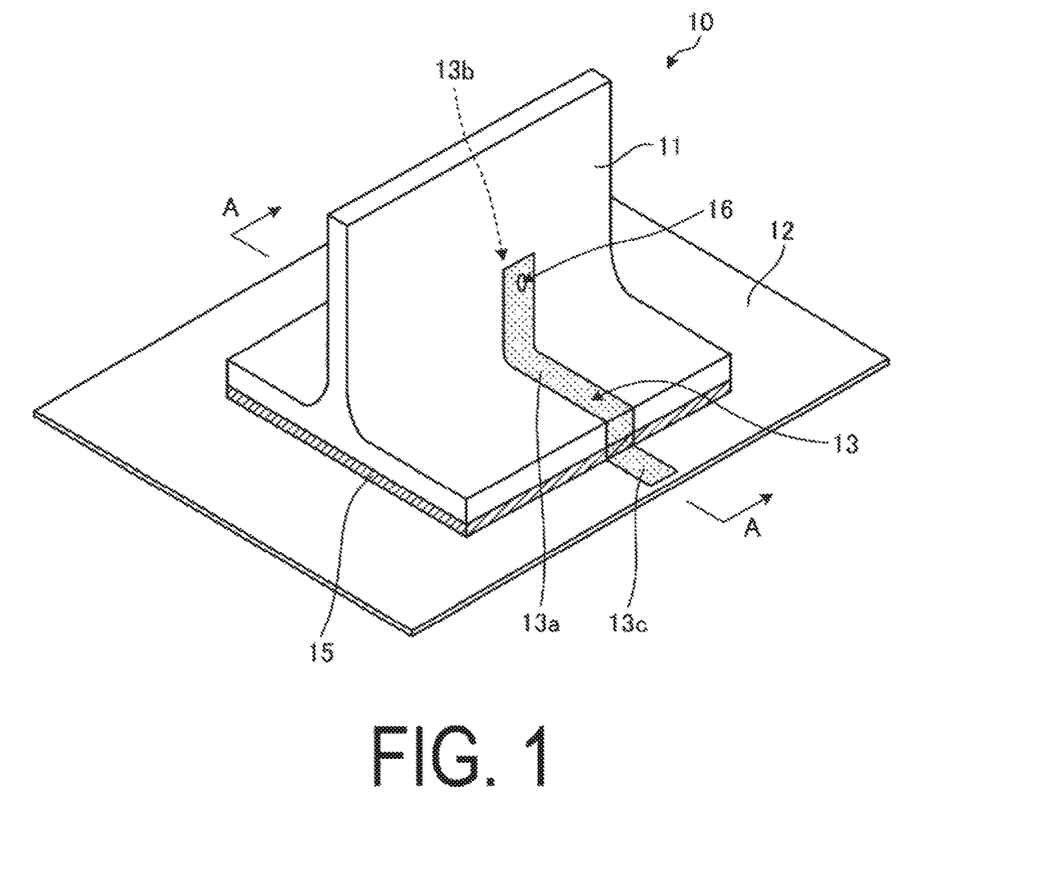
FIG. 1 is a perspective view illustrating a composite material structure according to a first embodiment.
Figure 2:
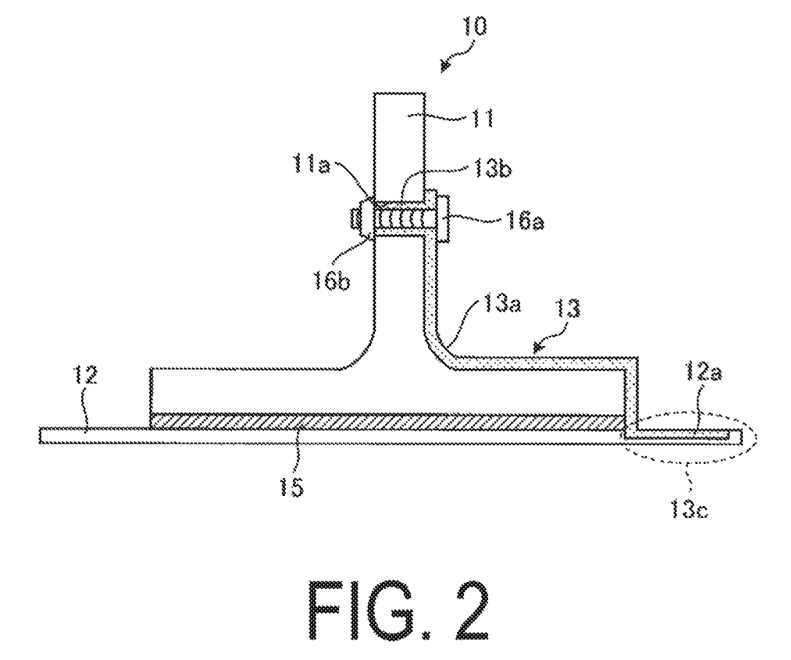
FIG. 2 is a cross-sectional view taken along A-A in FIG. 1.

FIG. 1 is a perspective view illustrating a composite material structure 10 according to a first embodiment. FIG. 2 is a cross-sectional view taken along A-A in FIG. 1. As illustrated in FIGS. 1 and 2, the composite material structure 10 includes a first composite material 11, a second composite material 12, and a low-conductivity material 13. The composite material structure 10 in the first embodiment is used in an aircraft body, though the present invention is not limited thereto, and the composite material structure may be used in other structures such as automobiles, vehicles, ships, and the like.

The first composite material 11 includes a conductive first reinforcing fiber and a first resin impregnated into the first reinforcing fiber. The first resin may cover the first reinforcing fiber. In the first embodiment, the first composite material 11 is exemplified as a T-shaped post used for a stringer, frame, or longeron of the aircraft body. Specifically, the first composite material 11 is obtained by integrating a plate-like flange portion provided opposite to one flat surface of the second composite material 12 with a plate-like web portion extending in a direction orthogonal to the flange portion. As illustrated in FIG. 2, the first composite material 11 is provided with a through-hole 11a in the web portion, which penetrates the web portion in a direction orthogonal to the web portion. Note that the shape of the first composite material 11 is not limited to this, and may be any shape having a surface with which the first composite material 11 is connected to and integrated with the second composite material 12.

The second composite material 12 includes a conductive second reinforcing fiber and a second resin impregnated into the second reinforcing fiber. The second resin may cover the second reinforcing fiber. In the first embodiment, the second composite material 12 is exemplified as a plate used as a skin of the aircraft body. The second composite material 12 is provided with an embedding portion 12a, in which the low-conductivity material 13 described later is embedded, in a predetermined region adjacent to a region where the first composite material 11 is provided, on a surface opposed to the flange portion of the first composite material 11. The shape of the second composite material 12 according to the present invention is not limited to this, and may be any shape having a surface with which the second composite material 12 is connected to and integrated with the first composite material 11.

The first reinforcing fiber and the second reinforcing fiber each are exemplified as a bundle of several hundreds to several thousands of basic fibers of 5 μm to 7 μm. Examples of the preferable basic fibers constituting the first reinforcing fiber and the second reinforcing fiber include conductive carbon fibers and metal fibers. Note that the first composite material 11 and the second composite material 12 may incorporate a glass fiber, an aramid fiber, and a plastic fiber in addition to the conductive first reinforcing fiber and second reinforcing fiber.

Examples of the first resin and the second resin include a resin containing a thermosetting resin as a main component, such as an epoxy resin, a polyester resin, and a vinyl ester resin. Note that the first resin and the second resin may incorporate a thermoplastic resin in addition to the thermosetting resin. Examples of the incorporated thermoplastic resin include a polyamide resin, a polypropylene resin, an Acrylonitrile Butadiene Styrene (ABS) resin, polyether ether ketone (PEEK), polyetherketoneketone (PEKK), and polyphenylene sulfide (PPS). The first resin and the second resin are not limited to these resins, and may also be other resins.

When the resin impregnated into the reinforcing fiber is a thermosetting resin, the thermosetting resin can be in a softened state, a cured state, and a semi-cured state. The softened state is a state before the thermosetting resin is heat-cured. The softened state is a state that is not self-supporting, and is a state in which the shape cannot be maintained when not supported on a support. The softened state is a state in which the thermosetting resin can undergo a heat curing reaction when heated. The cured state is a state after the thermosetting resin is heat-cured. The cured state is a state that is self-supporting, and is a state in which the shape can be maintained even when not supported on a support. The cured state is a state in which the thermosetting resin cannot undergo a heat curing reaction even when heated. The semi-cured state is a state between the softened state and the cured state. The semi-cured state is a state in which the thermosetting resin is subjected to heat curing to a weaker degree than in the cured state. The semi-cured state is a state that is self-supporting, and is a state in which the shape can be maintained even when not supported on a support. The semi-cured state is a state in which the thermosetting resin can undergo a heat curing reaction when heated. In the following, an intermediate base material of the composite material in which the reinforcing fibers are impregnated with the uncured thermosetting resin is referred to as a prepreg as appropriate.

The low-conductivity material 13 has a lower electrical resistance than that of the first resin and the second resin and a low conductivity greater than or equal to that of the first reinforcing fiber and the second reinforcing fiber. In the first embodiment, the low-conductivity material constituting the low-conductivity material 13 is obtained by incorporating conductive carbon powders into an electrically-insulating material containing a resin, and forming the mixture into a predetermined shape. The low-conductivity material constituting the low-conductivity material 13 according to the present invention is not limited to this, and may be any material having an electrical resistance value from $10^3 \Omega$ to $10^8 \Omega$ between a point at which the low-conductivity material 13 is electrically connected to the first reinforcing fiber and a point at which the low-conductivity material 13 is electrically connected to the second reinforcing fiber.

As illustrated in FIGS. 1 and 2, the low-conductivity material 13 has regions 13a, 13b and 13c. The region 13a is a portion that is not in contact with both the first reinforcing fiber and the second reinforcing fiber. The region 13a is a region between the region 13b and the region 13c, and partially extends in the direction in which the first composite material 11 is opposed to the second composite material 12 and is in contact with the side surface of the first composite material 11. The region 13b is a region that is located at one end of the low-conductivity material 13 and is adjacent to one side of the region 13a. The region 13b is a portion that is embedded in the first resin in the through-hole 11a, and is in contact with the first reinforcing fiber to be electrically connected to the first reinforcing fiber. The region 13c is a region that is located at the other end of the low-conductivity material 13, and is adjacent to the other side of the region 13a. The region 13c is a portion that is embedded in the second resin in an embedding portion 12a, and is in contact with the second reinforcing fiber to be electrically connected to the second reinforcing fiber.

The composite material structure 10 has the low-conductivity material 13 of such configuration, and the low-conductivity material 13 may electrically connect the first reinforcing fiber to the second reinforcing fiber, thus appropriately setting a path for passing lightning electricity.

In addition, in the composite material structure 10, the low-conductivity material 13 of such configuration has an electrical resistance greater than or equal to that of the first reinforcing fiber and the second reinforcing fiber, and preferably, the electrical resistance value from $10^3 \Omega$ or greater. Thus, the low-conductivity material 13 may suppress generation of excessive Joule heat due to an excessive current, and a starting point for electricity flowing into the internal structure. Additionally, since the electrical resistance of the low-conductivity material 13 of such configuration is lower than that of the first resin and the second resin, and the electrical resistance value is preferably $10^8 \Omega$ or less, lightning electricity as well as a potential difference generated between the first composite material 11 and the second composite material 12 due to static electricity may be appropriately reduced.

Since the composite material structure 10 has the configuration as described above, and the low-conductivity material 13 having a lower electrical resistance than the first resin and the second resin and a low conductivity greater than or equal to that of the first reinforcing fiber and the second reinforcing fiber electrically connects the first reinforcing fiber impregnated with the first resin to the second reinforcing fiber impregnated with the second resin, lightning electricity may be passed to the first composite material 11 and the second composite material 12 in an appropriate range without any damage, thereby appropriately taking lightning proofing measures.

In addition, in the composite material structure 10, the low-conductivity material 13 may electrically connect the first reinforcing fiber to the second reinforcing fiber at the one end and the other end embedded, thereby appropriately setting the path for passing lightning electricity.

As illustrated in FIGS. 1 and 2, the composite material structure 10 may further include an insulating adhesive layer 15. The insulating adhesive layer 15 is a layer formed of an electrically-insulating adhesive, and adheres the flat surface of the flange portion of the first composite material 11 and one surface of the second composite material 12 opposite to each other, thereby integrating the first composite material 11 with the second composite material 12. Even when the composite material structure 10 further includes the insulating adhesive layer 15, the low-conductivity material 13 of the above-mentioned configuration may suppress the occurrence of dielectric breakdown in the insulating adhesive layer 15, and in turn large amount of heat or breakage due to dielectric breakdown. Since the insulating adhesive layer 15 in the composite material structure 10 adheres the first composite material 11 to the second composite material 12 in this manner, even in cases of reduced costs and reduced weight of the overall structure, lightning proofing measures may be appropriately taken.

Note that the composite material structure 10 in the first embodiment includes the insulating adhesive layer 15 to integrate the first composite material 11 with the second composite material 12, though the present invention is not limited to this. For example, the first composite material 11 may be adhered to and integrated with the second composite material 12 through a reaction such as curing of the first resin contained in the first composite material 11 or the second resin contained in the second composite material 12. Also in this case, the low-conductivity material 13 may suppress dielectric breakdown of the adhered portions of the first composite material 11 and the second composite material 12.

As illustrated in FIGS. 1 and 2, the composite material structure 10 may further include a bolt 16a and a nut 16b. Note that the bolt 16a and the nut 16b are included in the first embodiment, though the present invention is not limited thereto, and the bolt 16a and the nut 16b may not be included. A fastener may be used instead of the bolt 16a, or a collar may be used instead of the nut 16b. The bolt 16a is provided through the through-hole 11a in the first composite material 11. The bolt 16a may be electrically conductive, and all of surfaces opposed to the first composite material 11 are covered with the low-conductivity material 13. That is, the low-conductivity material 13 is provided so as to form a sleeve that substantially covers the bolt 16a in the region 13b. Further, the sleeve-like region 13b of the low-conductivity material 13 is fastened to the inner side of the through-hole 11a through the bolt 16a and the nut 16b. Even when the composite material structure 10 further includes the bolt 16a and the nut 16b, the low-conductivity material 13 of such configuration may suppress generation of excessive Joule heat due to an excessive current flowing to the bolt 16a and the nut 16b, and prevent the bolt 16a and the nut 16b from becoming starting points for electricity flowing into the internal structure. Even when the bolt 16a and the nut 16b are required to be provided as described above in terms of strength, manufacturing method, and the like, appropriate lightning proofing measures may be taken for the composite material structure 10.

Figure 3:
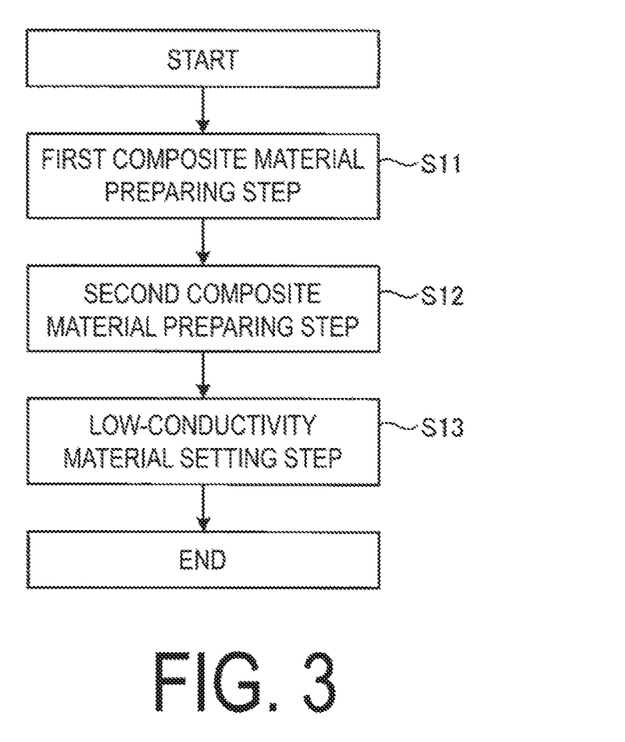
FIG. 3 is a flowchart illustrating a method for manufacturing the composite material structure according to the first embodiment.

FIG. 3 is a flowchart illustrating a method for manufacturing the composite material structure 10 according to the first embodiment. As illustrated in FIG. 3, the method for manufacturing the composite material structure 10 according to the first embodiment includes a first composite material preparing step S11, a second composite material preparing step S2, and a low-conductivity material setting step S13.

The first composite material preparing step S11 is a step of preparing the first composite material 11. In the first composite material preparing step S11, the first composite material 11 including the first resin in a semi-cured state is obtained by impregnating the first reinforcing fiber with the first resin, shaping the impregnated fiber, and forming the through-hole 11a. Alternatively, in the first composite material preparing step S11, the first composite material 11 including the first resin in a semi-cured state may be obtained by impregnating the first reinforcing fiber with the first resin, shaping the impregnated fiber into a sheet, stacking the sheets impregnated with the first resin, and forming the through-hole 11a.

The second composite material preparing step S12 is a step of preparing the second composite material 12. In a second composite material preparing step S12, the second composite material 12 including the second resin in a semi-cured state is obtained by impregnating the second reinforcing fiber with the second resin. Alternatively, in the second composite material preparing step S12, the second composite material 12 including the second resin in a semi-cured state may be obtained by impregnating the second reinforcing fiber with the second resin, shaping the impregnated fiber into a sheet, and stacking the sheets impregnated with the second resin.

The low-conductivity material setting step S13 is a step of electrically connecting the first reinforcing fiber to the second reinforcing fiber by setting the low-conductivity material 13. In the low-conductivity material setting step S13 according to the first embodiment, first, the low-conductivity material 13 is formed into a predetermined shape, and a portion of the region 13b of the low-conductivity material 13 is formed into a sleeve shape, which can be inserted and fitted into the through-hole 11a of the first composite material 11, and into which the bolt 16a can be inserted and fitted. In the low-conductivity material setting step S13 according to the first embodiment, next, the region 13c of the low-conductivity material 13 is embedded in the embedding portion 12a of the second composite material 12, and they are co-cured, thereby electrically connecting the low-conductivity material 13 to the second reinforcing fiber in the region 13c.

Here, in the first embodiment, preferably, in the low-conductivity material setting step S13, the insulating adhesive layer 15 is formed by embedding the region 13c of the low-conductivity material 13 in the embedding portion 12a of the second composite material 12 and then, applying an electrically-insulating adhesive onto opposing surfaces of the first composite material 11 and the second composite material 12 and solidifying it.

In the low-conductivity material setting step S13 according to the first embodiment, subsequently, the sleeve-like portion of the region 13b of the low-conductivity material 13 is inserted into the through-hole 11a of the first composite material 11 to embed the region 13b of the low-conductivity material 13 in the through-hole 11a of the first composite material 11, thereby electrically connecting the low-conductivity material 13 to the first reinforcing fiber in the region 13b. Then, the bolt 16a is inserted into the sleeve-like portion of the region 13b of the low-conductivity material 13 and is tightened in the nut 16b from the side opposite to the side where the bolt 16a is inserted, thereby fixing the sleeve-like portion of the region 13b of the low-conductivity material 13 to the inner side of the through-hole 11a by tightening the bolt 16a in the nut 16b. In this manner, in the low-conductivity material setting step S13 according to the first embodiment, the low-conductivity material 13 that electrically connects the first reinforcing fiber to the second reinforcing fiber is set.

Note that the mechanical integration process of the first composite material 11 and the second composite material 12, and the electrical connection process between the first composite material 11 or the second composite material 12 and the low-conductivity material 13 are not necessarily performed in the above-mentioned order, and may be performed in any other order as appropriate.

The method for manufacturing the composite material structure 10 has the configuration described above, and in the low-conductivity material setting step S13, the low-conductivity material 13 having a lower electrical resistance than that of the first resin and the second resin and a low conductivity greater than or equal to that of the first reinforcing fiber and the second reinforcing fiber electrically connects the first reinforcing fiber impregnated with the first resin to the second reinforcing fiber impregnated with the second resin. Therefore, in the composite material structure 10, lightning electricity may be passed to the first composite material 11 and the second composite material 12 in an appropriate range without any damage, thereby appropriately taking lightning proofing measures.

Second Embodiment

Figure 4:
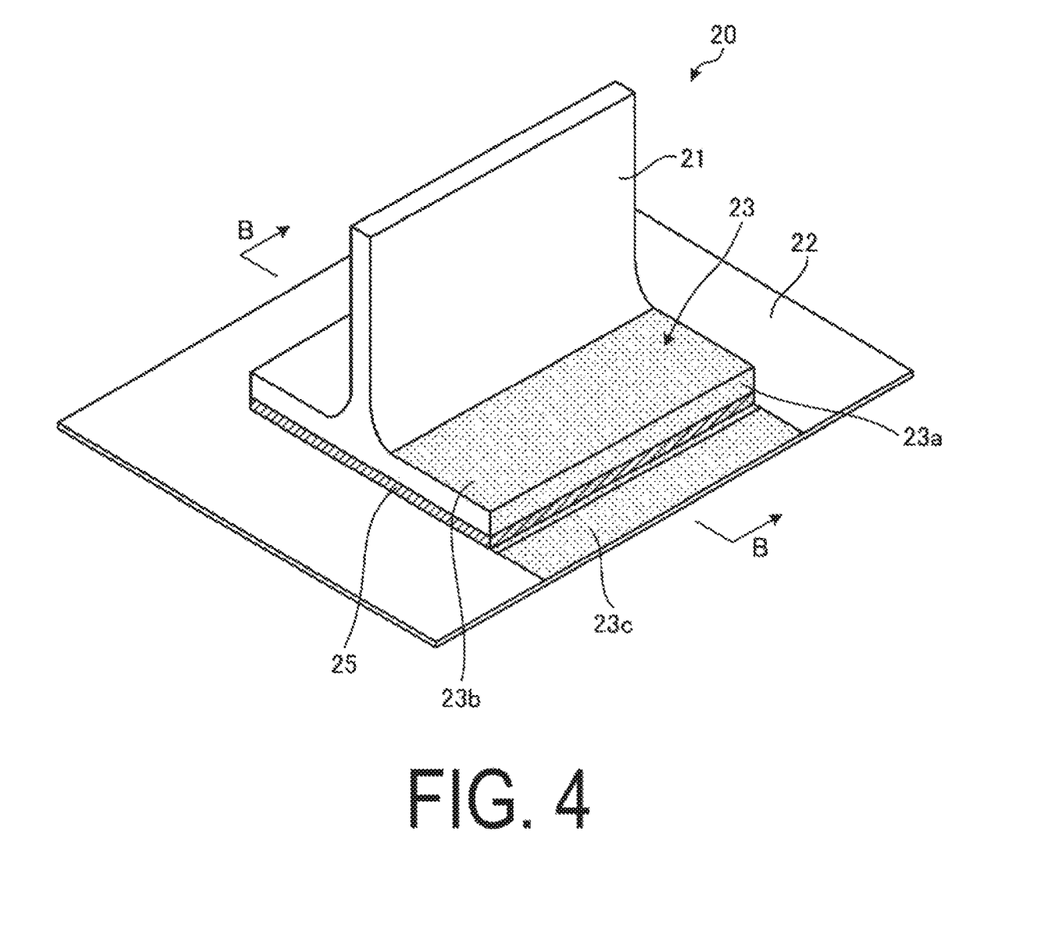
FIG. 4 is a perspective view illustrating a composite material structure according to a second embodiment.
Figure 5:
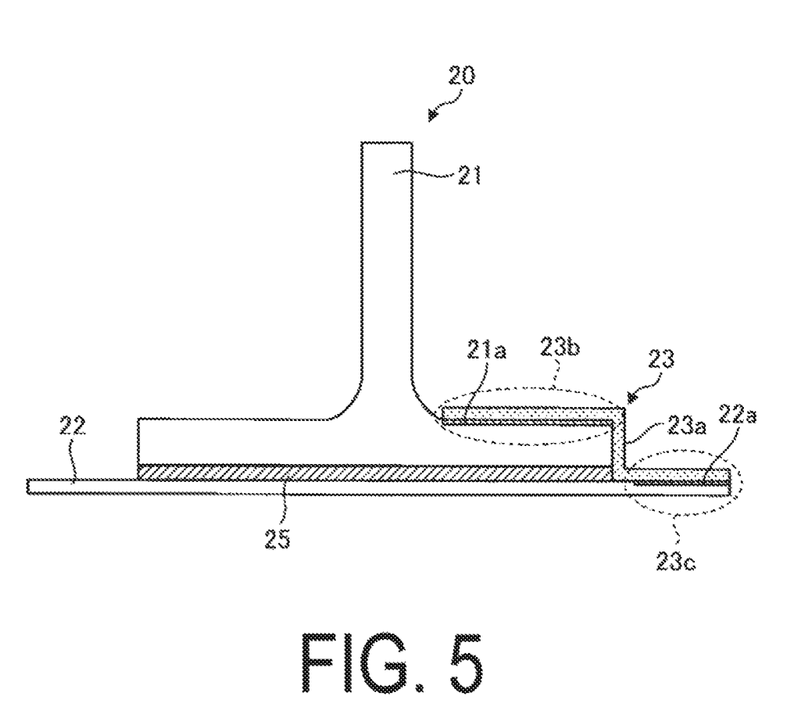
FIG. 5 is a cross-sectional view taken along B-B in FIG. 4.

FIG. 4 is a perspective view illustrating a composite material structure 20 according to a second embodiment. FIG. 5 is a cross-sectional view taken along B-B in FIG. 4. The composite material structure 20 according to the second embodiment is different from the composite material structure 10 according to the first embodiment in the manner of setting the low-conductivity material 13. Since the composite material structure 20 is similar to the composite material structure 10 for other configurations, detailed descriptions thereof will be omitted.

Note that, in the description of the composite material structure 20 according to the second embodiment, for convenience of explanation, different reference numerals from those of the composite material structure 10 according to the first embodiment are used for components in the specification and drawings. Specifically, the first composite material 11, the second composite material 12, the low-conductivity material 13, and the insulating adhesive layer 15 in the composite material structure 10 correspond to a first composite material 21, a second composite material 22, a low-conductivity material 23, and an insulating adhesive layer 25 in the composite material structure 20, respectively.

As illustrated in FIGS. 4 and 5, the composite material structure 20 includes the first composite material 21, the second composite material 22, and the low-conductivity material 23. The first composite material 21 is provided with a first exposed portion 21a instead of the through-hole 11a in the first composite material 11. The first exposed portion 21a is a portion where the first reinforcing fiber included in the first composite material 21 is exposed on the surface of the first composite material 21, that is, a portion where the first resin covering the first reinforcing fiber is removed from the surface of the first composite material 21. As illustrated in FIG. 5, the first exposed portion 21a is provided in a predetermined region of the first composite material 21 adjacent to a region where the second composite material 22 is provided on a surface opposite to a surface opposed to the second composite material 22, that is, a region adjacent to a below-mentioned second exposed portion 22a when viewed from the first composite material 21 in a direction in which the first composite material 21 and the second composite material 22 are opposed to each other. The first exposed portion 21a is formed by applying a blasting process such as sanding to this region of the first composite material 21. The first composite material 21 is the same as the first composite material 11 for other configurations.

The second composite material 22 is provided with the second exposed portion 22a instead of the embedding portion 12a in the second composite material 12. The second exposed portion 22a is a portion where the second reinforcing fiber included in the second composite material 22 is exposed on the surface of the second composite material 22, that is, a portion where the second resin covering the second reinforcing fiber is removed from the surface of the second composite material 22. As illustrated in FIG. 5, the second exposed portion 22a is provided in a predetermined region of the second composite material 22 adjacent to a region where the first composite material 21 is provided on a surface opposed to the flange portion of the first composite material 21, that is, a region adjacent to the first exposed portion 21a when viewed from the first composite material 21 in a direction in which the first composite material 21 and the second composite material 22 are opposed to each other. Similar to the first exposed portion 21a, the second exposed portion 22a is formed by applying a blasting process such as sanding to this region of the second composite material 22. The second composite material 22 is the same as the second composite material 12 for other configurations.

The low-conductivity material 23 has the same physical properties as the low-conductivity material 13, and uses a similar material, but is set in a different manner from the low-conductivity material 13. As illustrated in FIGS. 4 and 5, like the low-conductivity material 13, the low-conductivity material 23 has regions 23a, 23b, and 23c. The region 23a is a portion that is not in contact with both the first reinforcing fiber and the second reinforcing fiber. The region 23a is a region between the region 23b and the region 23c, and extends in the direction in which the first composite material 21 is opposed to the second composite material 22 and is in contact with the side surface of the first composite material 21. The region 23b is a region that is located at one end of the low-conductivity material 23 and is adjacent to one side of the region 23a. The region 23b is a portion that is in contact with the first exposed portion 21a, thereby being in contact with the first reinforcing fiber and electrically connected to the first reinforcing fiber. The region 23c is a region located at the other end of the low-conductivity material 23, and is adjacent to the other side of the region 23a. The region 23c is a portion that is in contact with the second exposed portion 22a, thereby being in contact with the second reinforcing fiber and electrically connected to the second reinforcing fiber.

The composite material structure 20 is different from the composite material structure 10 according to the first embodiment in the manner of setting the low-conductivity material 13 and thus, do not have the bolt 16a and the nut 16b.

The composite material structure 20 has the low-conductivity material 23 of such configuration, achieving the same effects as those of the composite material structure 10 having the above-mentioned low-conductivity material 13.

A method for manufacturing the composite material structure 20 according to the second embodiment is different from the method for manufacturing the composite material structure 10 according to the first embodiment in a first composite material preparing step S11, a second composite material preparing step S12, and a low-conductivity material setting step S13.

In the first composite material preparing step S11 according to the second embodiment, the first exposed portion 21a is formed instead of the through-hole 11a in the first composite material preparing step S11 according to the first embodiment. In the first composite material preparing step S11 according to the second embodiment, specifically, the first composite material 21 is obtained by impregnating the first reinforcing fiber with the first resin, shaping the impregnated fiber, and then applying a blasting process such as sanding to a predetermined region.

In the second composite material preparing step S12 according to the second embodiment, the second exposed portion 22a is formed instead of forming the embedding portion 12a in the second composite material preparing step S12 according to the first embodiment. In the second composite material preparing step S12 according to the second embodiment, specifically, the second composite material 22 is obtained by impregnating the second reinforcing fiber with the second resin, shaping the impregnated fiber, and then applying a blasting process such as sanding to a predetermined region.

Here, in the second embodiment, preferably, the insulating adhesive layer 25 is formed by applying an electrically-insulating adhesive onto the opposing surfaces of the first composite material 11 and the second composite material 12, prior to the low-conductivity material setting step S13.

In the low-conductivity material setting step S13 according to the second embodiment, the low-conductivity material 23 is set instead of setting the low-conductivity material 13 in the low-conductivity material setting step S13 according to the first embodiment. In the low-conductivity material setting step S13 according to the second embodiment, similar to the low-conductivity material setting step S13 according to the first embodiment, first, the low-conductivity material 23 is formed into a predetermined shape. In the low-conductivity material setting step S13 according to the second embodiment, next, the region 23b of the low-conductivity material 23 is disposed in contact with the first exposed portion 21a of the first composite material 21, and the region 23c of the low-conductivity material 23 is disposed in contact with the second exposed portion 22a of the second composite material 22. In this manner, in the low-conductivity material setting step S13 according to the second embodiment, the low-conductivity material 23 that electrically connects the first reinforcing fiber to the second reinforcing fiber is set.

The method for manufacturing the composite material structure 20 has the configuration described above, achieving the same effects as those of the above-mentioned method for manufacturing the composite material structure 10.

Third Embodiment

Figure 6:
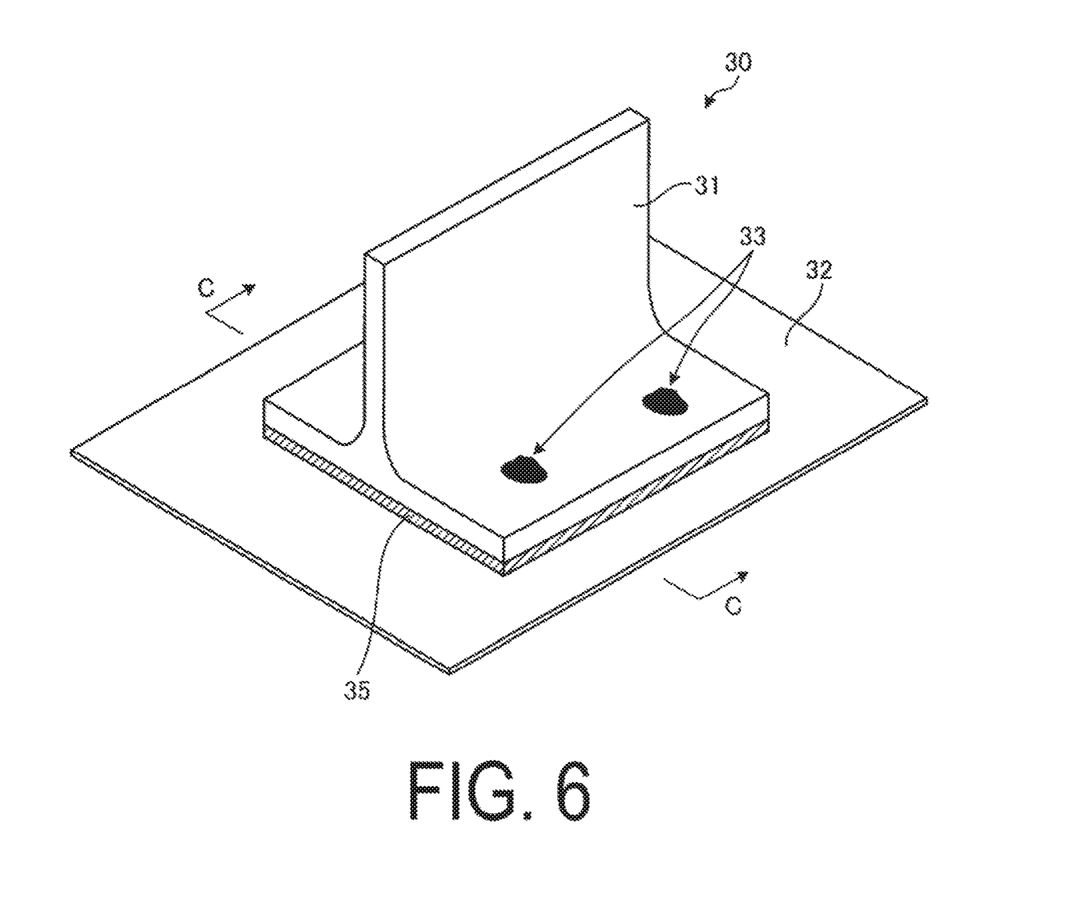
FIG. 6 is a perspective view illustrating a composite material structure according to a third embodiment.
Figure 7:
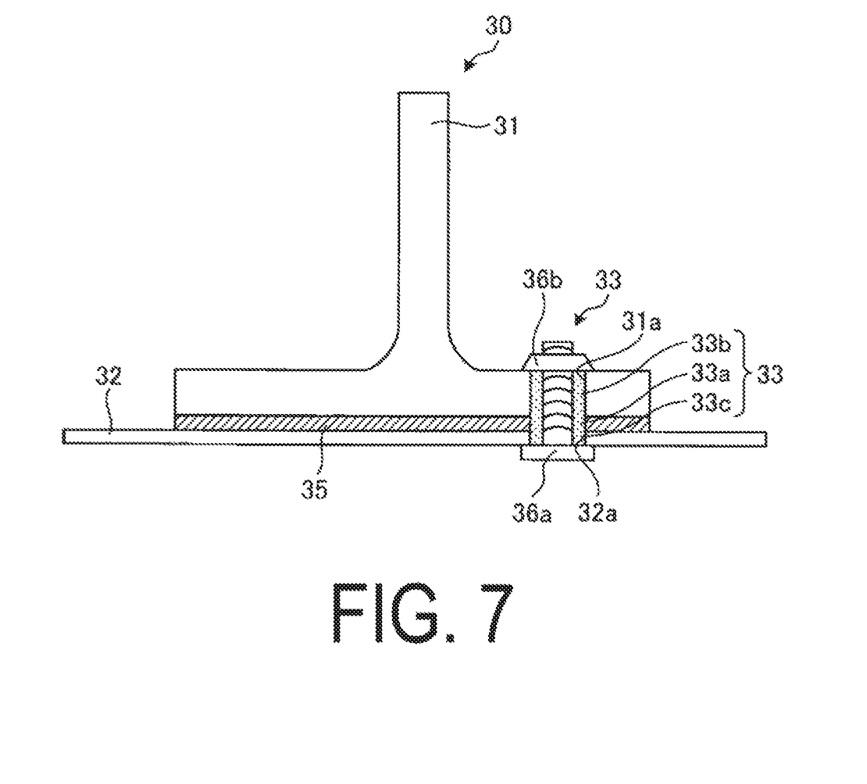
FIG. 7 is a cross-sectional view taken along C-C in FIG. 6.

FIG. 6 is a perspective view illustrating a composite material structure 30 according to a third embodiment. FIG. 7 is a cross-sectional view taken along C-C in FIG. 6. Similar to the composite material structure 20 according to the second embodiment, the composite material structure 30 according to the third embodiment is different from the composite material structure 10 according to the first embodiment in the manner of setting the low-conductivity material 13. Since the composite material structure 30 is similar to the composite material structure 10 for other configurations, detailed descriptions thereof will be omitted.

Note that, in the description of the composite material structure 30 according to the third embodiment, for convenience of explanation, different reference numerals from those of the composite material structure 10 according to the first embodiment are used for components in the specification and drawings. Specifically, the first composite material 11, the second composite material 12, the low-conductivity material 13, and the insulating adhesive layer 15 in the composite material structure 10 correspond to a first composite material 31, a second composite material 32, a low-conductivity material 33, and an insulating adhesive layer 35 in the composite material structure 30, respectively.

Particularly, even when it is required to integrate the first composite material 31 with the second composite material 32 using below-mentioned fastener 36a and collar 36b in terms of strength, manufacturing method, and the like, lightning proofing measures may be appropriately taken for the composite material structure 30 according to the third embodiment, similar to the composite material structure 10 according to the first embodiment.

As illustrated in FIGS. 6 and 7, the composite material structure 30 includes the first composite material 31, the second composite material 32, and the low-conductivity material 33. As illustrated in FIGS. 6 and 7, the composite material structure 30 may further include the fastener 36a and the collar 36b that integrate the first composite material 31 with the second composite material 32. Note that the fastener 36a and the collar 36b are included in the third embodiment, though the present invention is not limited thereto, and the fastener 36a and the collar 36b may not be included. Alternatively, a bolt may be used instead of the fastener 36a, or a nut may be used instead of the collar 36b.

The first composite material 31 is provided with a through-hole 31a instead of the through-hole 11a in the first composite material 11. Unlike the through-hole 11a, the through-hole 31a is provided in, rather than the web portion, a plate-like flange portion provided opposed to one flat surface of the second composite material 32. The first composite material 31 is the same as the first composite material 11 for other configurations.

The second composite material 32 is provided with a through-hole 32a instead of the embedding portion 12a in the second composite material 12. The through-hole 32a is located so as to communicate with the through-hole 31a described above at the position where the first composite material 31 is joined to the second composite material 32. The second composite material 32 is the same as the second composite material 12 for other configurations.

The low-conductivity material 33 has the same physical properties as the low-conductivity material 13, and uses a similar material, but is set in a different manner from the low-conductivity material 13. As illustrated in FIGS. 6 and 7, the low-conductivity material 33 has regions 33a, 33b, and 33c. The region 33a is a portion that is not in contact with both the first reinforcing fiber and the second reinforcing fiber. The region 33a is a region between the region 33b and the region 33c, and extends in the direction in which the first composite material 31 is opposed to the second composite material 32. Note that the region 33a may be omitted. The region 33b is a region that is located at one end of the low-conductivity material 33 and is adjacent to one side of the region 33a. The region 33b is a portion that is embedded in the first resin in the through-hole 31a, and is in contact with the first reinforcing fiber to be electrically connected to the first reinforcing fiber. The region 33c is a region located at the other end of the low-conductivity material 33, and is adjacent to the other side of the region 33a. The region 33c is a portion that is embedded in the second resin in the through-hole 32a, and is in contact with the second reinforcing fiber to be electrically connected to the second reinforcing fiber.

The fastener 36a is provided through the through-hole 31a of the first composite material 31 and the through-hole 32a of the second composite material 32. The fastener 36a may be electrically conductive, and all surfaces opposed to the first composite material 31 and all surfaces opposed to the second composite material 32 are covered with the low-conductivity material 33. That is, the low-conductivity material 33 is provided so as to form a sleeve that substantially covers the fastener 36a. The sleeve-like low-conductivity material 33 is fixed to the inner side of the through-hole 31a and the through-hole 32a through tightening the fastener 36a in the collar 36b. Even when it is required to integrate the first composite material 31 with the second composite material 32 through the fastener 36a and the collar 36b in terms of strength, manufacturing method, and the like, since the composite material structure 30 has the low-conductivity material 33 of such configuration, the low-conductivity material may suppress generation of excessive Joule heat due to an excessive current flowing to the fastener 36a and the collar 36b, and prevent the fastener 36a and the collar 36b from becoming starting points for electricity flowing into the internal structure. Thus, as in the place where the bolt 16a and the nut 16b of the composite material structure 10 according to the first embodiment are provided, lightning proofing measures may be appropriately taken.

The composite material structure 30 has the low-conductivity material 33 of such configuration, achieving the same effects as those of the composite material structure 10 having the above-mentioned low-conductivity material 13.

Note that, as illustrated in FIGS. 6 and 7, the composite material structure 30 may further include an insulating adhesive layer 35 like the insulating adhesive layer 15, but may not include the insulating adhesive layer 35. Even when costs and the weight of the overall structure are reduced by adhering the first composite material 31 to the second composite material 32 with the insulating adhesive layer 35, and when it is required to integrate the first composite material 31 with the second composite material 32 using only the fastener 36a and the collar 36b without providing the insulating adhesive layer 35 in terms of design, the composite material structure 30 may achieve the same effects as those of the composite material structure 10.

A method for manufacturing the composite material structure 30 according to the third embodiment is different from the method for manufacturing the composite material structure 10 according to the first embodiment in a first composite material preparing step S11, a second composite material preparing step S12, and a low-conductivity material setting step S13.

In the first composite material preparing step S11 according to the third embodiment, the through-hole 31a is formed instead of forming the through-hole 11a in the first composite material preparing step S11 according to the first embodiment.

In the second composite material preparing step S12 according to the third embodiment, the through-hole 32a is formed instead of forming the embedding portion 12a in the second composite material preparing step S12 according to the first embodiment. In the second composite material preparing step S12 according to the third embodiment, specifically, the second composite material 32 is obtained by impregnating the second reinforcing fiber with the second resin, shaping the impregnated fiber, and then forming the through-hole 32a in a predetermined region.

In the low-conductivity material setting step S13 according to the third embodiment, the low-conductivity material 33 is set instead of setting the low-conductivity material 13 in the low-conductivity material setting step S13 according to the first embodiment. In the low-conductivity material setting step S13 according to the third embodiment, similar to the low-conductivity material setting step S13 according to the first embodiment, first, the low-conductivity material 33 is formed into a sleeve shape covering the side surface of the fastener 36a. In the low-conductivity material setting step S13 according to the third embodiment, next, the first reinforcing fiber is electrically connected to the second reinforcing fiber by providing the sleeve-like low-conductivity material 33 in the through-hole 31a in the first composite material 31 and the through-hole 32a in the second composite material 32. Then, by inserting the fastener 36a into the sleeve-like low-conductivity material 33, and tightening the fastener 36a in the collar 36b from the side opposite to the side where the fastener 36a is inserted, the sleeve-like low-conductivity material 33 is fixed to the inner side of the through-hole 31a and the through-hole 32a by tightening the fastener 36a in the collar 36b, and the first composite material 31 is integrated with the second composite material 32. In this way, in the low-conductivity material setting step S13 according to the third embodiment, the low-conductivity material 33 that electrically connects the first reinforcing fiber to the second reinforcing fiber is set.

Note that in the third embodiment, the insulating adhesive layer 35 may be formed by applying an electrically-insulating adhesive onto the opposing surfaces of the first composite material 31 and the second composite material 32 and solidifying it, before passing the sleeve-like low-conductivity material 33 through the through-hole 31a in the first composite material 31 and the through-hole 32a in the second composite material 32.

The method for manufacturing the composite material structure 30 has the configuration described above, achieving the same effects as those of the above-mentioned method for manufacturing the composite material structure 10.

Fourth Embodiment

Figure 8:
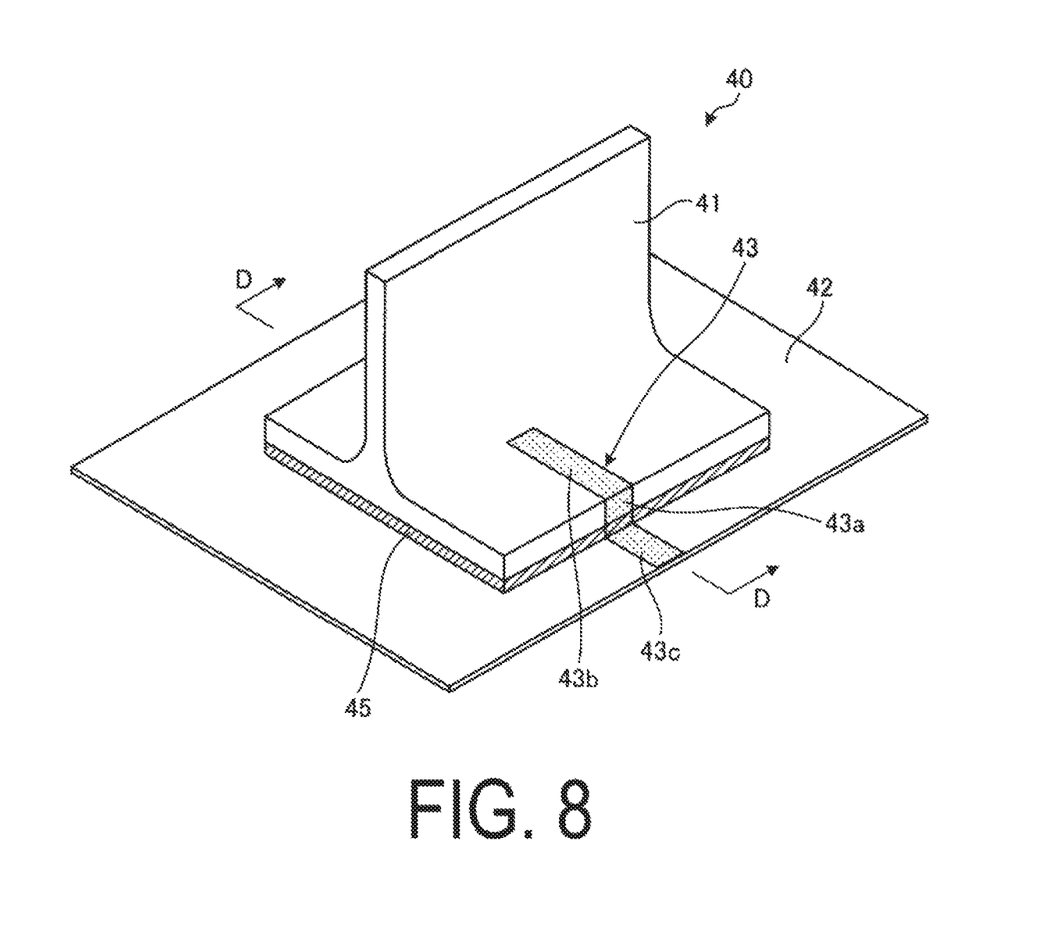
FIG. 8 is a perspective view illustrating a composite material structure according to a fourth embodiment.
Figure 9:
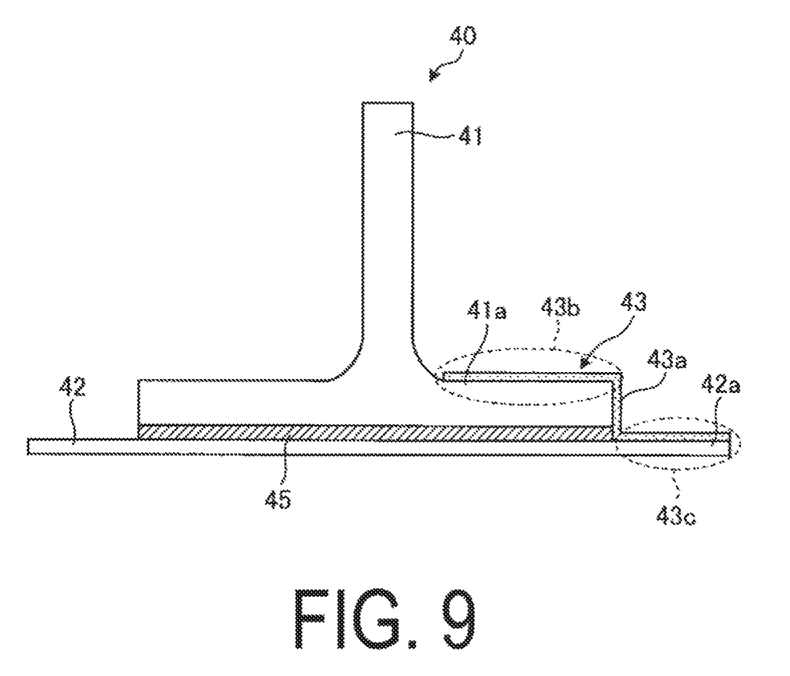
FIG. 9 is a cross-sectional view taken along D-D in FIG. 8.

FIG. 8 is a perspective view illustrating a composite material structure 40 according to a fourth embodiment. FIG. 9 is a cross-sectional view taken along D-D in FIG. 8. Similar to the composite material structure 20 according to the second embodiment and the composite material structure 30 according to the third embodiment, the composite material structure 40 according to the fourth embodiment is different from the composite material structure 10 according to the first embodiment in the manner of setting the low-conductivity material 13. Since the composite material structure 40 is similar to the composite material structure 10 for other configurations, detailed descriptions thereof will be omitted.

Note that, in the description of the composite material structure 40 according to the fourth embodiment, for convenience of explanation, different reference numerals from those of the composite material structure 10 according to the first embodiment are used for components. Specifically, the first composite material 11, the second composite material 12, the low-conductivity material 13, and the insulating adhesive layer 15 in the composite material structure 10 correspond to a first composite material 41, a second composite material 42, a low-conductivity material 43, and an insulating adhesive layer 45 in the composite material structure 40, respectively.

As illustrated in FIGS. 8 and 9, the composite material structure 40 includes the first composite material 41, the second composite material 42, and the low-conductivity material 43. The first composite material 41 is provided with, instead of the through-hole 11a in the first composite material 11, an embedding portion 41a in which the low-conductivity material 43 is embedded, and contains the first resin having a thermoplastic resin instead of the thermosetting resin as a main component. Note that the listed examples of the thermoplastic resins that may be incorporated in the first resin included in the first composite material 11 may be preferably used as the thermoplastic resin, which is the main component of the first resin included in the first composite material 41. Further, the first resin included in the first composite material 41 may incorporate a thermosetting resin and other resins in addition to the thermoplastic resin.

As illustrated in FIG. 9, the embedding portion 41a is provided in a predetermined region of the first composite material 41 adjacent to a region where the second composite material 42 is provided on a surface opposite to a surface opposed to the second composite material 42, that is, a region adjacent to a below-mentioned embedding portion 42a when viewed from the first composite material 41 in a direction in which the first composite material 41 and the second composite material 42 are opposed to each other. The embedding portion 41a is a portion in which the low-conductivity material 43 is embedded due to the elasticity of the first resin containing the thermoplastic resin as the main component. The first composite material 41 is the same as the first composite material 11 for other configurations.

The second composite material 42 is provided with, instead of the embedding portion 12a in the second composite material 12, the embedding portion 42a in which a below-mentioned low-conductivity material 43 is embedded, and contains the second resin having the thermoplastic resin as a main component instead of the thermosetting resin as a main component. Note that the listed examples of the first resin contained in the first composite material 41 are suitably used as the second resin contained in the second composite material 42.

As illustrated in FIG. 9, the embedding portion 42a is provided in a predetermined region of the second composite material 42 adjacent to a region where the first composite material 41 is provided on a surface opposed to the flange portion of the first composite material 41, that is, a region adjacent to the embedding portion 41a when viewed from the first composite material 41 in a direction in which the first composite material 41 and the second composite material 42 are opposed to each other. The embedding portion 42a is a portion in which the low-conductivity material 43 is embedded due to the elasticity of the second resin containing the thermoplastic resin as the main component. The second composite material 42 is the same as the second composite material 12 for other configurations.

The low-conductivity material 43 has the same physical properties as the low-conductivity material 13, and uses a similar material, but is set in a different manner from the low-conductivity material 13. As illustrated in FIGS. 8 and 9, like the low-conductivity material 13, the low-conductivity material 43 has regions 43a, 43b, and 43c. The region 43a is a portion that is not in contact with both the first reinforcing fiber and the second reinforcing fiber. The region 43a is a region between the region 43b and the region 43c, and extends in the direction in which the first composite material 41 is opposed to the second composite material 42 and is in contact with the side surface of the first composite material 41. The region 43b is a region that is located at one end of the low-conductivity material 43 and is adjacent to one side of the region 43a. The region 43b is a portion that is embedded in the first resin in an embedding portion 41a, and is in contact with the first reinforcing fiber to be electrically connected to the first reinforcing fiber. The region 43c is a region located at the other end of the low-conductivity material 43, and is adjacent to the other side of the region 43a. The region 43c is a portion that is embedded in the second resin in the embedding portion 42a, and is in contact with the second reinforcing fiber to be electrically connected to the second reinforcing fiber.

Similar to the composite material structure 20, the composite material structure 40 is different from the composite material structure 10 according to the first embodiment in the manner of setting the low-conductivity material 13 and thus, do not have the bolt 16a and the nut 16b.

The composite material structure 40 has the low-conductivity material 43 of such configuration, achieving the same effects as those of the composite material structure 10 having the above-mentioned low-conductivity material 13.

A method for manufacturing the composite material structure 40 according to the fourth embodiment is different from the method for manufacturing the composite material structure 10 according to the first embodiment in a first composite material preparing step S11, a second composite material preparing step S12, and a low-conductivity material setting step S13.

The first composite material preparing step S11 according to the fourth embodiment, the embedding portion 41a is formed instead of forming the through-hole 11a in the first composite material preparing step S11 according to the first embodiment. In the first composite material preparing step S11 according to the fourth embodiment, specifically, the first composite material 41 is obtained by impregnating the first reinforcing fiber with the first resin containing the thermoplastic resin as the main component and shaping the impregnated fiber.

In the second composite material preparing step S12 according to the fourth embodiment, the embedding portion 42a is formed instead of forming the embedding portion 12a in the second composite material preparing step S12 according to the first embodiment. In the second composite material preparing step S12 according to the fourth embodiment, specifically, the second composite material 42 is obtained by impregnating the second reinforcing fiber with the second resin having the thermoplastic resin as the main component and shaping the impregnated fiber.

In the fourth embodiment, the insulating adhesive layer 45 is formed by applying an electrically-insulating adhesive onto the opposing surfaces of the first composite material 41 and the second composite material 42 and solidifying it, prior to the low-conductivity material setting step S13.

In the low-conductivity material setting step S13 according to the fourth embodiment, the low-conductivity material 43 is set instead of setting the low-conductivity material 13 in the low-conductivity material setting step S13 according to the first embodiment. In the low-conductivity material setting step S13 according to the fourth embodiment, similar to the low-conductivity material setting step S13 according to the first embodiment, first, the low-conductivity material 43 is formed into a predetermined shape. In the low-conductivity material setting step S13 according to the fourth embodiment, next, the first resin is softened by heating and then, the region 43b of the low-conductivity material 43 is embedded in the embedding portion 41a of the first composite material 41, and the second resin is softened by heating and then, the region 43c of the low-conductivity material 43 is embedded in the embedding portion 42a of the second composite material 42. In this manner, in the low-conductivity material setting step S13 according to the fourth embodiment, the low-conductivity material 43 that electrically connects the first reinforcing fiber to the second reinforcing fiber is set.

The method for manufacturing the composite material structure 40 has the configuration described above, achieving the same effects as those of the above-mentioned method for manufacturing the composite material structure 10.

REFERENCE SIGNS LIST 10, 20, 30, 40 Composite material structure
11, 21, 31, 41 First composite material
11a, 31a, 32a Through-hole
12, 22, 32, 42 Second composite material
12a, 41a, 42a Embedding portion
13, 23, 33, 43 Low-conductivity material
13a, 13b, 13c, 23a, 23b, 23c, 33a, 33b, 33c, 43a, 43b, 43c Region
15, 25, 35, 45 Insulating adhesive layer
16a Bolt
16b Nut
21a First exposed portion
22a Second exposed portion
36a Fastener
36b Collar

The invention claimed is:
1. A composite material structure comprising:
a first composite material having a conductive first reinforcing fiber and a first resin impregnated into the first reinforcing fiber;
a second composite material integrated with the first composite material, the second composite material having a conductive second reinforcing fiber and a second resin impregnated into the second reinforcing fiber; and
a low-conductivity material having an electrical resistance
less than an electrical resistance of the first resin and less than an electrical resistance of the second resin and
no less than an electrical resistance of the first reinforcing fiber and no less than an electrical resistance of the second reinforcing fiber, the low-conductivity material electrically connecting the first reinforcing fiber to the second reinforcing fiber; and an electrically-insulating adhesive layer that has electrically-insulating properties and that is configured to integrate the first composite material with the second composite material by adhering a surface of the first composite material and a surface of the second composite material, the surfaces facing each other.

2. The composite material structure according to claim 1, wherein one end of the low-conductivity material is embedded in the first resin to be electrically connected to the first reinforcing fiber, and the other end is embedded in the second resin to be electrically connected to the second reinforcing fiber.

3. The composite material structure according to claim 2, wherein both the first resin and the second resin are thermoplastic resins.

4. The composite material structure according to claim 1, wherein one end of the low-conductivity material is electrically connected to a first exposed portion of the first reinforcing fiber which is exposed on a surface of the first composite material, and the other end is electrically connected to a second exposed portion of the second reinforcing fiber which is exposed on a surface of the second composite material.

5. The composite material structure according to claim 1, wherein the low-conductivity material includes a low-conductivity sleeve disposed through the first composite material and the second composite material to cover a fastener configured to integrate the first composite material with the second composite material.

6. A method for manufacturing a composite material structure, the method comprising:

a first composite material preparing step of preparing a first composite material having a conductive first reinforcing fiber and a first resin impregnated into the first reinforcing fiber;

a second composite material preparing step of preparing a second composite material having a conductive second reinforcing fiber and a second resin impregnated into the second reinforcing fiber; and a low-conductivity material setting step of setting a low-conductivity material having a lower electrical resistance less than an electrical resistance of the first resin and less than an electrical resistance of the second resin and no less than an electrical resistance of the first reinforcing fiber and no less than an electrical resistance of the second reinforcing fiber, the low-conductivity material electrically connecting the first reinforcing fiber to the second reinforcing fiber, and an electrically-insulating adhesive layer setting step of setting an electrically-insulating adhesive layer having electrically-insulating properties to integrate the first composite material with the second composite material by adhering a surface of the first composite material and a surface of the second composite material, the surfaces facing each other.

* * * * *